A. L. WILKES
HEAT CONTROL FOR ELECTRIC FURNACES.
APPLICATION FILED AUG. 2, 1919.
1,377,952.
Patented May 10, 1921.
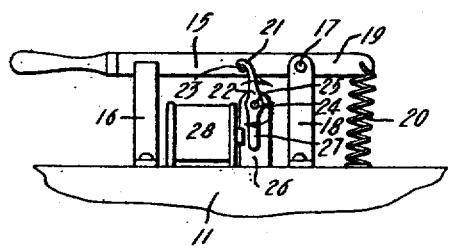
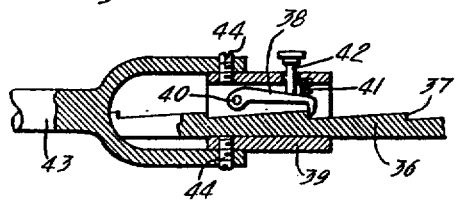
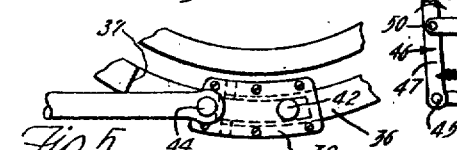
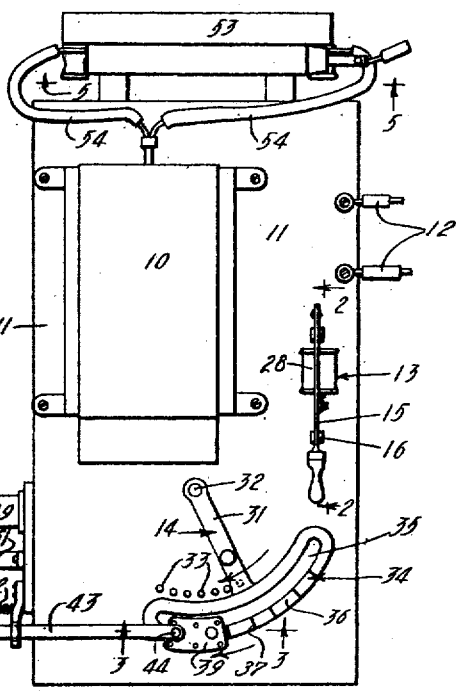
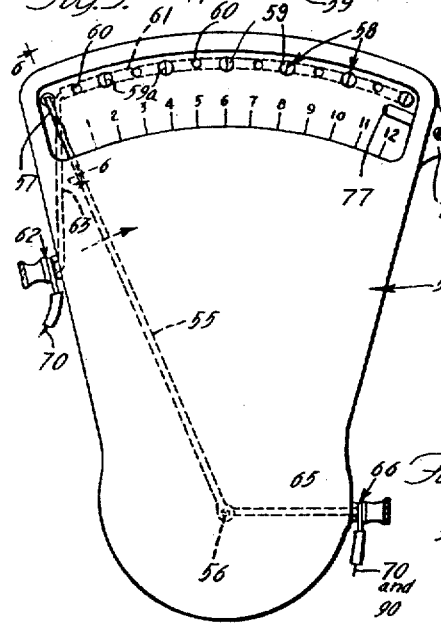
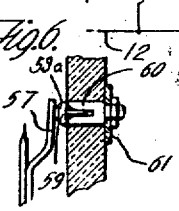
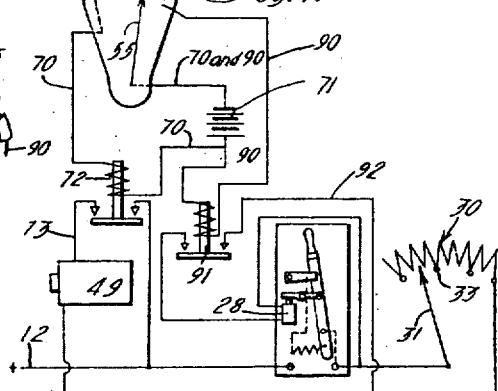
Inventor
Alfred L. Wilkes
by James T. Barlow
his Attorney

UNITED STATES PATENT OFFICE.

ALFRED L. WILKES, OF LOS ANGELES, CALIFORNIA.

HEAT CONTROL FOR ELECTRIC FURNACES.

1,377,952.  Specification of Letters Patent.  Patented May 10, 1921.

Application filed August 2, 1919. Serial No. 314,858.

*To all whom it may concern:*

Be it known that I, ALFRED L. WILKES, a citizen of the United States, residing at Los Angeles, in the county of Los Angeles, State of California, have invented new and useful Improvements in Heat Controls for Electric Furnaces, of which the following is a specification.

This invention relates to heat control devices for electric furnaces, and particularly to electric furnaces such as are used in dentistry. It is an object of the invention to provide a device of this character which will automatically control the heating of an oven and which will automatically turn the oven off when it reaches a predetermined temperature.

The invention is particularly directed to provide a simple and reliable mechanism which will regulate an oven so as to heat gradually and substantially evenly. The gradual heating of the oven causes articles which are in the oven to heat or bake evenly and thereby eliminates warping or cracking of said articles due to sudden changes in temperature. This feature of the invention is particularly desirable in connection with dental ovens as the porcelain used in dentistry requires gradual or even baking.

A further feature of the invention is the controlling of the oven by the heat of the said oven; that is, before the control mechanism operates so as to cause an increase in the temperature of the oven, the oven must reach a certain predetermined temperature. The mechanism is so arranged that it can be set in such a manner as to cause the temperature of the oven to increase when said oven reaches certain temperatures. The construction and arrangement of the mechanism may be such as to cause further rise in temperature just as the oven reaches the maximum temperature allowed by the previous actuation. When the mechanism is arranged in this manner the heating of the oven will be gradual and even.

Further objects of the invention as well as the details of construction of a preferred form of the invention will be readily understood from the following detailed description in which reference is had to the accompanying drawings, in which—

Figure 1 is a plan view of the oven; Fig. 2 is an enlarged detail section taken as indicated by line 2—2 on Fig. 1, showing the main control switch; Fig. 3 is an enlarged detail section taken as indicated by line 3—3 on Fig. 1; Fig. 4 is an enlarged plan view of the parts shown in Fig. 3; Fig. 5 is an enlarged detail section taken as indicated by line 5—5 on Fig. 1, showing a face view of the pyrometer; Fig. 6 is an enlarged detailed section taken as indicated by line 6—6 on Fig. 5; and Fig. 7 is a diagram of the electrical system.

In the drawings numeral 10 designates a typical dental oven which is mounted on a suitable base 11. The oven 10 is heated by an electric current which is conducted to the oven by lead wires 12. Before entering the oven 10 the current must pass through a main control switch 13 and a variable resistance which is controlled by controlling mechanism 14. The main control switch 13 is a knife switch and has a blade 15 which engages a contact 16. The blade 15 is pivotally mounted at 17 on a bracket 18 and has an extended portion 19 to which is attached a spring 20. The spring 20 is connected between the portion 19 and the base 11 and tends at all times to open the switch. The blade 15 is kept in engagement with the contact 16 by a hook portion 21 on the end of a lever arm 22. The hook 21 engages a pin 23 which projects from the blade 15. The lever arm 22 is one arm of a lever 24 which is pivotally mounted at 25 on a bracket 26. The lever arm 27 of the lever 24 extends downwardly and is adapted to be moved by electro-magnet 28. When the electro-magnet 28 is energized, as will hereinafter be described, the lever arm 27 is moved in the direction indicated by the arrow in Fig. 2, thereby causing hook 21 to disengage from pin 23. Upon disengagement of the hook 21 from the pin 23 the blade 15 will be thrown out of engagement with the contact 16 by the spring 20.

The control mechanism 14 of the rheostat 30 comprises an arm 31 which is pivotally mounted on the base 11 at 32. The arm 31 is adapted to be moved over and to engage contacts 33. The contacts 33 and the arm 31 are so connected, with the resistance in the rheostat, as to cause resistance to be cut out when the arm 31 is moved from one contact 33 to the next in the direction indicated by the arrow in Fig. 1. The end portion 34 of the arm 31 has a slot 35 in it, which causes a curved segment 36 to be formed on the arm 31. On the top of the curved segment 36 there are ratchet teeth 37 which are adapted to be engaged by a pawl 38 carried in a block or frame 39, said frame being mounted around said segment. The pawl 38 is pivotally mounted at 40 in the frame 39 and has a spring 41 in connection with it which tends at all times to keep it in engagement with the segment 36. A pin 42 projects from the pawl 38 through the frame 39 and provides a means by which the pawl may be lifted away from the segment 36, when it is desired to move the frame 39 independent of the segment 36. Pivotally connected to the frame 39 there is a connecting rod 43. The end of the connecting rod 43 which is connected to the frame 39 forms a yoke which is connected to the frame by means of pins 44. The other end of the connecting rod 43 is pivotally connected at 45 to lever arm 47 of lever 46. The arm 48 of the lever 46 is shaped as shown in Fig. 1, and is adapted to be moved in the direction indicated by the arrow when electro-magnet 49 is energized. The lever 46 is pivotally mounted at 50 on a bracket 51 which is mounted on base 11. Connected between the lever arm 47 and the base 11 there is a spring 52 which tends to keep the mechanism just described in the position shown in Fig. 1.

There is a pyrometer 53 in connection with the furnace which has lead wires 54 extending into the furnace 10. The hand 55 of the pyrometer 53 is pivotally mounted at 56. Attached to the underside and at the end of hand 55 there is a spring contact 57 which is adapted to pass over and engage contacts 58 in the frame of the pyrometer. The contacts 58 comprise plugs 59 that are removably held or carried in socket 60. There is a notch 59ª in each plug 59 which allows the spring contact 57 to pass over the plugs when moving in one direction only. The sockets 60 are all mounted on a bus-bar 61 which extends across the back of the pyrometer. The bus-bar 61 is connected to a binding post 62 by means of a wire 63. Connected to the hand 55 at the pivotal mounting 56 there is a wire 65 which connects the hand and a binding post 66. It will be readily seen that when the spring contact 57 engages one of the contacts 58 a current of electricity can be passed from one binding post to the other. As the oven becomes heated the hand 55 of the pyrometer will move in the direction indicated by the arrow in Fig. 5, and the spring contact 57 will engage the contacts 58 one after another.

The pyrometer 53 is connected in a circuit 70 which may be energized by a battery 71. Relay 72 in the circuit 70 will operate every time the circuit 70 is complete, or every time the spring contact 57 engages one of the contacts 58. The actuation of relay 72 causes the completion of circuit 73 in which electro-magnet 49 is connected. The completion of the circuit 73 causes energization of the electro-magnet 49 and thereby causes movement of lever arm 48 in the direction indicated by the arrow in Fig. 1. This movement of lever arm 48 due to the connection of connecting rod 43 between the frame 39 and the lever arm 47 causes movement of frame 39 in the direction indicated by the arrow in Fig. 1. The movement of frame 39 due to the engagement of pawl 38 with one of the ratchets 37 causes movement of arm 31. The various parts of the mechanism are so arranged and proportioned as to cause the movement of arm 31 to be just sufficient to move from one contact 33 to the next. When the arm 31 has moved from one contact 33 to the next a part of the resistance 30 is cut out thereby allowing more current to flow through the furnace. This increased amount of current flowing through the furnace 10 causes it to rise in temperature. The rise in temperature of the furnace 10 causes the hand 55 of the pyrometer to move in the direction indicated by the arrow in Fig. 5 until it engages another contact 57. When the spring contact 57 has engaged another contact 58 the circuit 70 is again completed and the mechanism actuated so as to cause the lever arm 31 to move to the next contact 33. The furnace continues to operate in this manner until the arm 55 engages rod 75. The notches 59ª in the plugs 59 are set so as to allow contact 57 to pass over them in the direction indicated by the arrow in Fig. 5 only. This prevents a drop in the temperature of the oven from causing hand 55 to move toward the zero point and thereby engage plugs which would cause actuation of the mechanism and thereby cut out resistance. The rod 75 is adjustably carried in a boss 76 in the pyrometer 53 and its end 77 may be adjusted to be at the point at which it is desired that the furnace be turned on. The engagement of hand 55 with rod 75 completes a circuit 90 which is also energized by battery 71. The completion of circuit 90 causes actuation of relay 91 which causes the closing of circuit 92 in which is connected electro-magnet 28. As has been hereinbefore described, the energization of electro-magnet 28 causes movement of lever 24 and thereby releases hook 21 which allows the switch 13 to be opened. The opening of the switch 13 turns the furnace 10 off and prevents it from becoming further heated.

It will be readily understood how the furnace may be turned off at any desired temperature by adjusting the rod 75. It is also possible to regulate the speed or rate at which the temperature of the furnace will increase. This regulation is accomplished by varying the arrangement of the plugs 59 in the sockets 60; for instance, by spacing the plugs as shown in Fig. 5, the furnace will heat more slowly whereas if the plugs were placed in consecutive or adjacent sockets 60 the heating of the furnace will be more rapid. The arrangement of resistance is such that, upon any one actuation of rheostat arm 31 to throw out a resistance unit, the temperature of the oven will then gradually rise and in time rise sufficiently to carry pyrometer hand 55 past several of the plug sockets 60; and if the plugs are set a distance apart corresponding to the maximum distance the hand will travel after any one actuation of control arm 31, then the heating (the increase in temperature) will be of maximum slowness. By spacing the plugs 59 closer together the heating may be correspondingly accelerated.

Having set forth a preferred form of the invention I do not wish to limit myself to the details hereinabove described but wish to reserve to myself any changes or modifications that may appear to those skilled in the art or that may fall within the scope of the following claims.

Having described a preferred form of my invention, I claim:

1. In combination with an oven or the like, means for heating the oven to varying temperatures, and means for automatically finally discontinuing the heating of said oven upon its reaching a predetermined final temperature.

2. In combination with an electrically heated oven, temperature controlled means for varying the heating current, and temperature controlled means for finally completely cutting off such current.

3. In combination an electrically heated oven, temperature controlled means for varying the heating current, said means embodying a movable contact arm and temperature regulated electro-magnet means to move said contact arm, and temperature controlled means for entirely cutting off such current.

4. In combination, an electrically heated oven, temperature controlled means for varying the heating current, said means embodying a movable contact arm and temperature regulated electro-magnet means to move said contact, and temperature controlled means for entirely cutting off such current, said means embodying a pyrometer, and a switch adapted to be opened by said pyrometer.

5. In combination, an electrically heated oven, temperature controlled means for varying the heating current, said means embodying a movable contact arm, an electromagnet in an electric circuit adapted to move said contact arm, and a pyrometer adapted to open and close said circuit.

6. In combination, an electrically heated oven, temperature controlled means for varying the heating current, said means embodying a movable contact arm, an electromagnet in an electric circuit adapted to move said contact arm, and a pyrometer having a movable contact adapted to engage adjustable contacts and thereby open and close said circuit.

7. In combination, an electrically heated oven or the like, electric heating means therefor embodying a variable resistance, mechanical means for varying the resistance step by step, and actuating means for the mechanical means embodying a pyrometer actuated by the temperature of the oven, an actuating circuit including contacts adapted to be engaged by a moving part of the pyrometer, and a carrier for the contacts on which they may be adjustably arranged in spaced relation, either at distances equal to or less than the distance the moving part will move by reason of the variation of the resistance by one step.

8. In combination with an oven or the like, means for heating the oven to different temperatures, and temperature regulated electromagnetic means for controlling said heating means.

9. In combination, an electrically heated oven or the like, electric heating means therefor embodying a variable resistance, mechanical means for varying the resistance step by step, actuating means for the mechanical means embodying a pyrometer actuated by the temperature of the oven, and means for automatically disconnecting finally the heating means upon the oven reaching a predetermined temperature, said means embodying an actuating circuit including an adjustable contact adapted to be engaged by a moving part of the pyrometer.

10. In combination with an oven or the like, heating means for the oven, means for energizing the heating means to cause the oven to successively reach certain predetermined higher temperatures after it has reached predetermined temperatures, and control means for the energizing means actuated by virtue of the oven reaching the predetermined higher temperatures.

11. In combination with an oven or the like, heating means for the oven adapted to heat the oven to certain predetermined temperatures after it reaches predetermined temperatures, temperature controlled means for controlling said heating means, said predetermined temperatures being successively one higher than the other, and means for automatically finally cutting off the heating means upon the oven reaching a predetermined temperature.

In witness that I claim the foregoing I have hereunto subscribed my name this 24th day of July, 1919.

ALFRED L. WILKES.

Witness:
  VIRGINIA I. BERINGER.